Oct. 30, 1934.  F. SCHICHT  1,979,176
PNEUMATIC CONVEYER
Filed Feb. 15, 1933
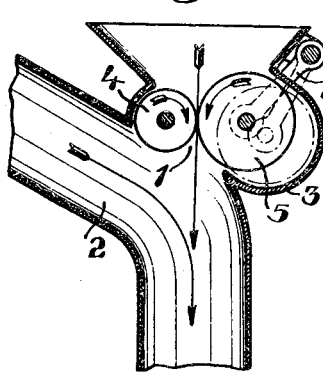
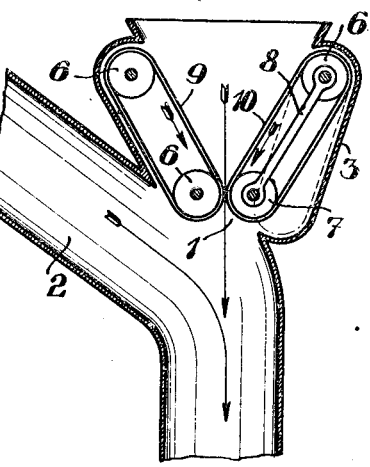
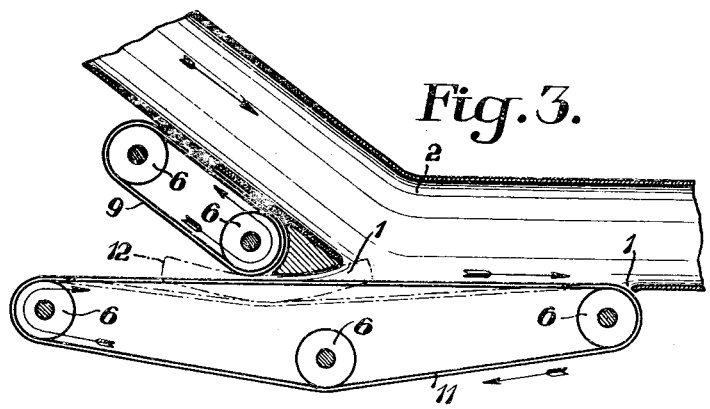
F. Schicht
INVENTOR Patented Oct. 30, 1934

1,979,176

UNITED STATES PATENT OFFICE 1,979,176

PNEUMATIC CONVEYER

Friedrich Schicht, Dresden, Germany

Application February 15, 1933, Serial No. 656,911
In Czechoslovakia February 24, 1932

3 Claims. (Cl. 302—36)

This invention relates to improvements in pneumatic conveying plant, for instance compressed air conveyers for agricultural use, and its object is to reduce the power required for operating them and to increase their efficiency.

The disadvantages of the methods and apparatus hitherto known for charging conveyers are mostly based upon the fact that the material to be conveyed enters into the conveyer pipe with an intrinsic velocity which differs substantially from the velocity of the conveying air, and that at the point where the material enters the plant, particularly in the case of irregular or interrupted charging, disturbing variations of pressure occur in the conveying medium. Furthermore the introduction above all of material consisting of individual long fibres into pressure pipes has hitherto occasioned great constructional difficulties and is associated with serious losses of efficiency, mainly in consequence of losses of air, or throttling of its current and formation of eddies. If the material is introduced on the suction side of the plant it experiences during its passage through the blower a comparatively high acceleration, so that in the further conveyer it has to be braked down to a much lower conveying speed. This however brings with it a defective utilization of the driving power. The sucking in of the material beyond the blower, that is to say, on the pressure side of the plant, requires a marked constriction of the pipe before the point of introduction for the purpose of bringing about the injector action that sucks the material that is to be conveyed into the pipe. This constriction involves a marked throttling of the current of air, and therefore necessitates an increased expenditure of power for operating the blower. The conveying air must under these circumstances accelerate the material lying in the filling hopper from a state of rest up to the conveying speed, and this results in pulsations and irregularities in the current of conveying air, and reduces the efficiency of the plant. The conditions are similar when the material is introduced through nozzles, which are charged for example by a current of air branching off from the blower. In both cases the pressure conditions vary in the introducing aperture itself as soon as supplementary air alone or with a greatly varying quantity of material to be conveyed enters through the said aperture owing to temporarily interrupted or irregular feeding of the material. These sudden variations in pressure give the material introduced a tendency to settle down, whenever the pressure falls, at the bends in the pipe, and either lead to a stoppage thereof or else require increased loading of the blower for the purpose of clearing the conveyer pipe.

According to the present invention these disadvantages are obviated by introducing the material to be conveyed into the pipe with an intrinsic velocity which corresponds to the velocity of flow of the conveying air at the point of introduction, this being effected preferably by means of members which prevent fluctuations of pressure at the introducing point resulting from variations in the quantity of material conveyed. For this purpose the material to be conveyed is seized by members fitted immediately in front of the introducing aperture, these members rotating or revolving at the speed at which the conveying air flows past the introducing point, and delivering the material into the conveyer pipe with this speed, so that it passes into the current of air without shocks or eddies. As introducing members there are preferably employed rollers or endless feeding belts arranged in pairs, which, with their surfaces, when running idly, close the feeding aperture, and rotate or revolve in opposite directions against the introducing aperture, so that they seize the material between them by a nipping action and deliver it into the pipe. The rollers or belts may be resiliently supported or may be provided with a resiliently yielding covering, of indiarubber for example. By the particles of materials introduced for conveyance, the feeding members bearing against one another are only separated from one another to the extent and for the time only that the gap thereby produced between them is filled up with the material that is being conveyed. An equalization of pressure between the conveyer pipe and the atmosphere is thereby obviated, thus practically precluding losses of conveying air, so that the steadiness of the current of conveying air is not impaired in any way.

Three different examples of the construction of apparatus according to the invention are diagrammatically illustrated in sectional elevation in Figures 1, 2 and 3 of the accompanying drawing.

In the construction shown in Fig. 1, the introducing aperture 1 of the pressure pipe 2 is sealed by the rollers 4 and 5 journalled in the casing 3, these rollers rotating with a peripheral speed equal to the speed with which the conveying air flows past the aperture 1. The roller 5 is rockably suspended on a link 8, and is pressed by a spring or the like against the roller 4. The working surfaces of the rollers may be covered with indiarubber or the like, and are suitable for introducing even material with long fibres, such as straw or the like, which can be thrown in either continuously or intermittently.

In the construction shown in Fig. 2 the material is introduced by two feeding belts 9 and 10, running round roller 6, 7 respectively. The lower guide roller 7 of the front belt conveyer 10 swings on a link 8, so that the belts 9 and 10 when running idly, bear against one another with their front ends, and seal the introducing aperture 1 of the conveying pipe 2. The material seized by the belt conveyers by a nipping action and driven towards the pipe raises the guide roller 7 of the belt conveyer 10 and opens the aperture 1 for the time of its passage, but at the same time shuts off the gap between the belts from the atmosphere.

In the construction according to Figure 3, the lower belt conveyer 11, running round rigidly or resiliently mounted guide rollers 6, is made of either resilient or unyielding material, and closes the introducing aperture 1 throughout its entire extent. When a portion 12 of the material to be conveyed passes through underneath the lower end of the unyielding belt conveyer 9 running round guide rollers 6, it forces its way so far into the yielding belt 11 that its upper surface lies flush with the surface of this belt. The material accordingly passes through into the conveying pipe 2 without an open air gap having been produced, through which any considerable quantities of air could pass.

In all the constructions the introducing members deliver the material that is being conveyed into the conveyer pipe with the same intrinsic speed and direction with which the conveying medium flows past the introducing aperture.

The same constructions also admit of being used without alteration for suction air conveyance, without requiring any provision for preventing the entrance or escape of subsidiary air.

By suitably dimensioning the introducing members and by regulating the driving thereof, in dependence upon the driving of the blower if desired, it is further possible with all these constructional forms to adapt the speed of introduction of the material that is to be conveyed to the actual speed of the conveying air in a continuous manner.

What I claim is:

1. Means for introducing into the conveying pipe of a pneumatic conveyer, through a charging aperture in the said pipe, the material to be conveyed, comprising a pair of endless feeding belts revolving in opposite directions and bearing yieldingly against one another at a point close to the charging aperture, the said feeding belts being adapted to seize the material with a nipping action and move it positively into the conveying pipe, while preventing admission and escape of air at the point of introduction, and also adapted at the same time to impart to the material an intrinsic velocity approximately corresponding to the velocity of conveyance at this part of the conveying pipe.

2. Means for introducing into the conveying pipe of a pneumatic conveyer, through a charging aperture in the bottom of the said pipe, the material to be conveyed comprising a pair of endless feeding belts revolving in opposite directions and bearing yieldingly against one another at a point close to the charging aperture, the said feeding belts being adapted to seize the material with a nipping action and move it positively into the conveying pipe, and also adapted at the same time to impart to the material an intrinsic velocity approximately corresponding to the velocity of conveyance at this part of the conveying pipe, the operative side of one of the belts closing the charging aperture so as to prevent admission and escape of air at the point of introduction, and forming the floor of the pipe at that point.

3. Means for introducing into the conveying pipe of a pneumatic conveyer, through a charging aperture in the said pipe, the material to be conveyed, comprising a pair of endless feeding belts revolving in opposite directions and bearing resiliently against one another at a point close to the charging aperture, the said feeding belts being adapted to seize the material with a nipping action, accelerate it up to the speed of conveyance and move it positively into the conveying pipe with this speed, and the operative side of one of the belts moving in the direction of conveyance and closing the charging aperture so as to prevent admission and escape of air.

FRIEDRICH SCHICHT.